United States Patent [19]

Swanson

[11] 4,339,139

[45] Jul. 13, 1982

[54] HYDRAULIC CIRCUIT FOR SYNCHRONOUS LIFT OF FLEXIBLE FRAME IMPLEMENTS

[75] Inventor: William C. Swanson, Clarendon Hills, Ill.

[73] Assignee: International Harvester Co., Chicago, Ill.

[21] Appl. No.: 156,897

[22] Filed: Jun. 5, 1980

[51] Int. Cl.³ .............................................. A01B 63/22
[52] U.S. Cl. .................................. 280/43.23; 91/518; 137/99; 172/401; 172/413
[58] Field of Search ............... 280/43.23, 43.17, 43.13; 172/2, 4, 413, 401, 406; 91/514, 515, 517, 518, 532; 60/420, 374; 137/99

[56] References Cited

U.S. PATENT DOCUMENTS

| 3,002,760 | 10/1961 | Lee | 91/514 X |
| 3,481,489 | 12/1969 | Stauffer | 91/515 X |
| 3,495,610 | 2/1970 | Van Aken | 137/99 |
| 3,677,009 | 7/1972 | Thatcher | 91/532 X |

FOREIGN PATENT DOCUMENTS 792519 8/1968 Canada ............................. 172/401

Primary Examiner—John A. Pekar
Attorney, Agent, or Firm—J. W. Gaines; F. D. Au Buchon

[57] ABSTRACT

A hydraulic circuit for synchronous lift of an implement having a center frame and flexibly connected left and right wing frames, each frame having an independent wheel assembly for raising and lowering the associated frame. A rotary flow divider is provided in a parallel connection of hydraulic rams to actuate the wheel assemblies. The flow divider has a section sized to provide the necessary flow to each ram so that all frames are raised and lowered in unison.

9 Claims, 4 Drawing Figures

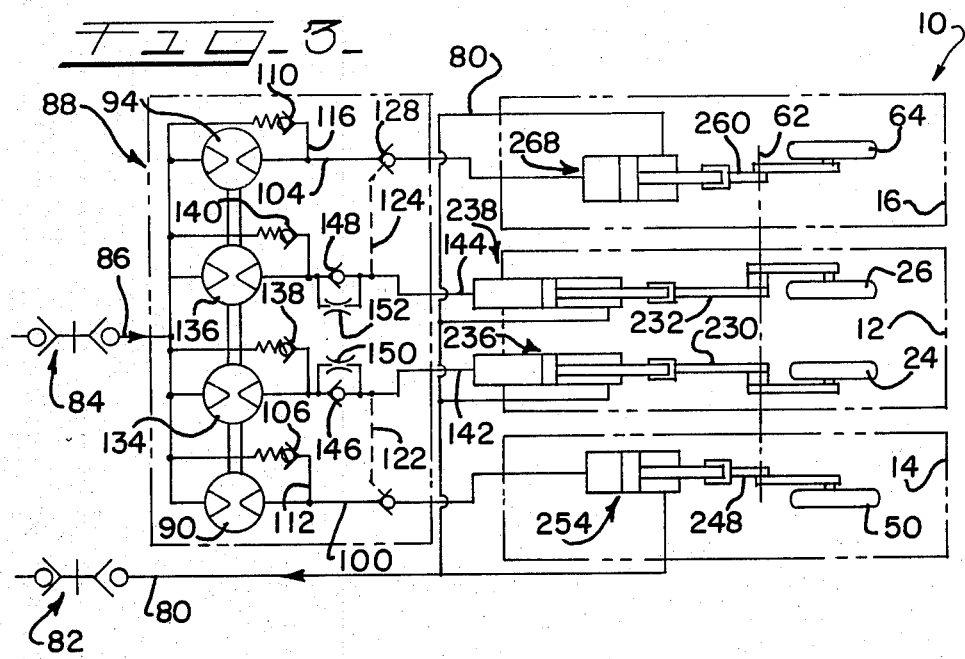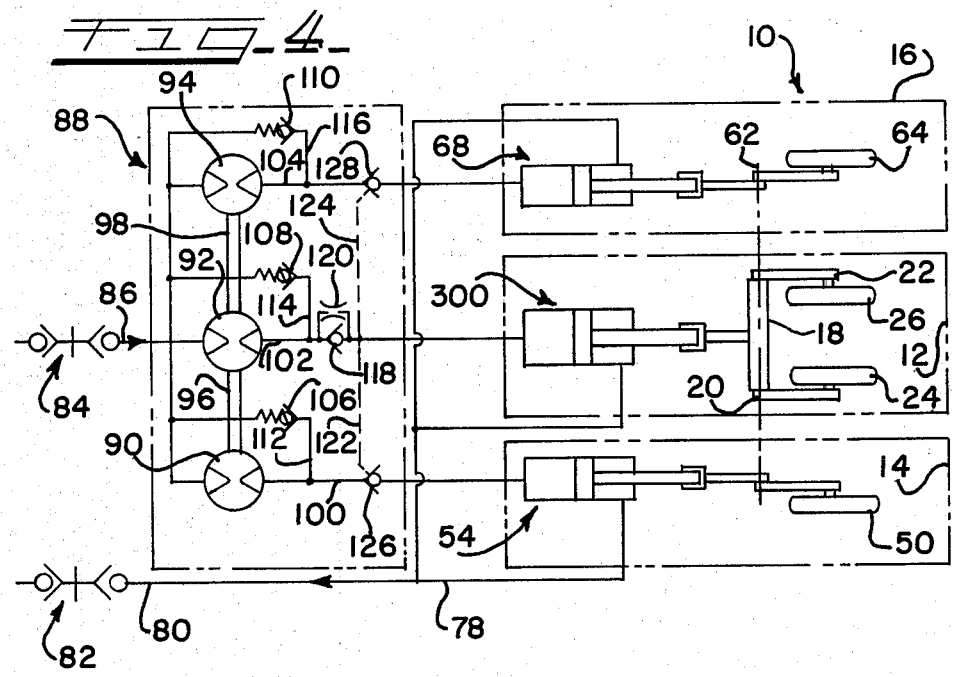

HYDRAULIC CIRCUIT FOR SYNCHRONOUS LIFT OF FLEXIBLE FRAME IMPLEMENTS

BACKGROUND AND SUMMARY OF THE INVENTION

This invention is related to and an improvement over U.S. patent applications of H. J. MacKenzie entitled IMPLEMENT LEVEL LIFT SYSTEM, Ser. No. 156,892, and Ser. No. 156,890, of W. C. Swanson entitled IMPLEMENT LEVEL LIFT SYSTEM WITH REPHASING VALUES, which applications have a filing date and assignee in common with this application.

Uniformly raising and lowering what are commonly called folding wing implements, such as multi-sectioned frame members of large disk harrows and cultivators, has long been a problem. The prior art attempts have tended to concentrate on the use of two sets of master-slave cylinders or rams. One end of each master cylinder was pivotally connected to the center or middle frame of the implement and the other ends thereof were connected by a lever system to a rock shaft to which the implement wheels were connected. The piston or head ends of the master cylinders were hydraulically connected in parallel and rod end of each master cylinder was independently hydraulically connected in series to the head end of the slave cylinder. The slave cylinders were each physically connected to a carrying wheel mounted on each of the wing frames. With the proper ratios of master rod chamber volume to slave head chamber volume, the wing frames would theoretically lift uniformly with the middle frame. The many deficiencies of the master-slave arrangement have been recited in the aforementioned co-pending applications and reference may be made thereto for a more complete understanding. However, even if these master-slave systems functioned perfectly, the volume of the master rod chamber had to equal the slave head chamber volume, assuming the linkage connecting the cylinders to the wheels was the same. Such an arrangement places a limitation on the implement designer which often increases cost because non-standard cylinders often have to be utilized on the implement.

It is, therefore, an object of this invention to provide a hydraulic circuit for synchronous lift of folding wing implements which permits use of standard size and conventional lift cylinders or rams.

It is also an object of this invention to provide such a hydraulic circuit which is capable of rephasing or synchronizing the lift rams, which rephases rapidly and efficiently, and which controls the maximum drop rate of the implement.

It is another object to provide such a hydraulic circuit which assures that the wing frames initiate their lowering at the same time as the center frame.

These and other objects of the present invention, and many of the attendant advantages thereof, will become more readily apparent from a perusal of the following description and the accompanying drawings, wherein:

FIG. 3 is a schematic of still another embodiment in which fully independent rams of different sizes are utilized; and FIG. 4 is a schematic of an embodiment similar to FIG. 1, but utilizing fewer cylinders.

DESCRIPTION OF THE PREFERRED EMBODIMENTS

Figure 1:
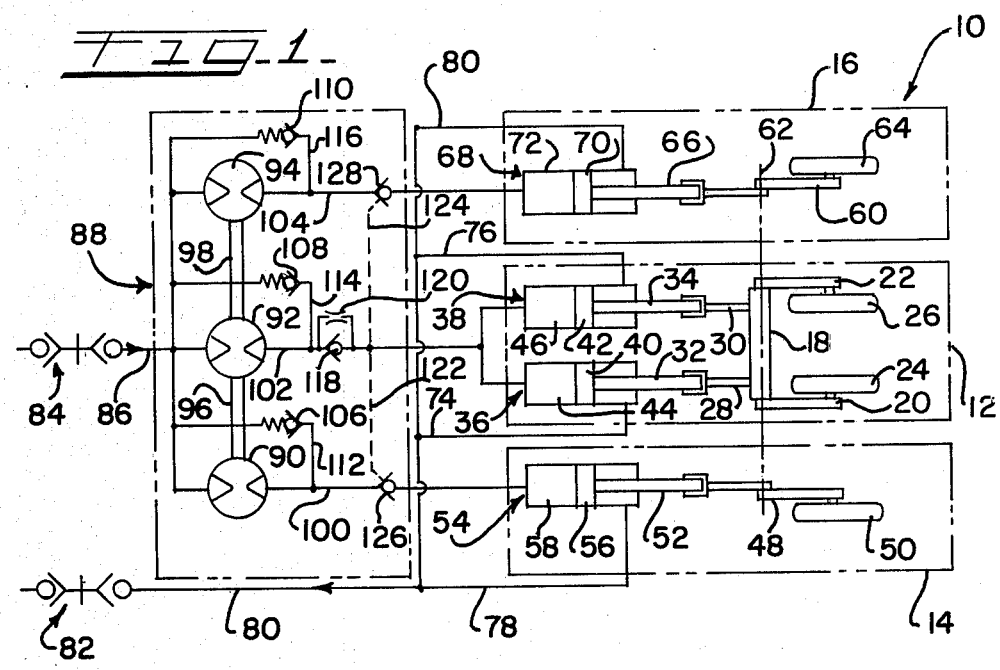
FIG. 1 is a hydraulic and mechanical schematic of an embodiment of the present invention in which rams of equal size are utilized.

Referring now to FIG. 1, there is shown an implement 10 having a center frame 12 to which wing frames 14 and 16 are pivotally connected. A rock shaft 18 is pivotally mounted on the center frame 12. A pair of lever arms 20 and 22 are secured to the rock shaft 18 with ground-engaging wheels 24 and 26 journaled on the free ends thereof. A second pair of lever arms 28 and 30 are also secured to the rock shaft 18 and are pivotally connected to the rods 32 and 34 of hydraulic rams 36 and 38. The rods 32 and 34 are affixed to pistons 40 and 42 respectively, which pistons are reciprocably retained within the cylinders 44 and 46, each of which is pivotally attached at their head end to the center frame 12.

The wing frame 14 has a bell crank 48 pivotally mounted thereon with a ground-engaging wheel 50 journaled on the lower arm of the bell crank and the rod 52 of hydraulic ram 54 pivotally attached to the upper arm of the bell crank 48. The ram 54 includes a piston 56 attached to the rod 52 and reciprocably retained within a cylinder 58 which is pivotally attached at its head end to the wing frame 14. The wing frame 16 is provided with a similar bell crank 60 pivotally mounted thereon, the bell cranks 60 and 48 and the rock shaft 18 being pivotal about a common axis 62. A ground-engaging wheel 64 is journaled on the lower arm of the bell crank 60 with the upper arm being pivotally attached to the rod 66 of hydraulic ram 68, which ram includes a piston 70 affixed to the rod 66 and reciprocably retained within a cylinder 72, which is pivotally secured at its head end to the wing frame 16. Extension of the rams 36, 38, 54 and 68 will rotate the rock shaft 18 and bell cranks 48 and 60 to raise the frames 12, 14 and 16, while contraction of these rams will lower the frames.

The rod ends of the rams 36, 38, 54 and 68 are connected in parallel by conduits 74, 76, 78 and 80 respectively, the conduit 80 extending to a hydraulic connector 82. The connector 82 and a similar connector 84 are conventional means of connecting the implement hydraulic system to the hydraulic system on a tractor, the latter system including a pump, reservoir and directional control valve, not shown, but arranged in a conventional and well known manner to selectively direct pressure from the pump to one of the connectors 80 and 82 while connecting the other connector to the reservoir. A conduit 86 branches into passages 100, 102 and 104 inside of a rotary flow divider, indicated generally at 88, having rotors 90, 92 and 94, which rotors may be of the gear or vane type, interposed in the respective passages. The passages 100 and 104 respectfully connect with the head end of rams 54 and 68, while passage 102 branches to connect with the head ends of cylinders 36 and 38. The rotors are interconnected by shafts 96 and 98 so that the rotors may function as hydraulic motor/pumps. That is, the flow through one rotor to a more lightly loaded ram will cause that rotor to drive the shaft or shafts connected thereto so that the rotor in the passage to the more heavily loaded ram will be driven as a pump. The net result is that flow to the rams will be properly proportioned. In the embodiment of FIG. 1, the rams 36, 38, 54 and 68 are of equal diameter and stroke. The rotors 90, 92 and 94 are therefore sized so that 50% of the flow through conduit 86 will be metered through the rotor 92 while 25% each will be metered through the rotors 90 and 94. As a consequence, the rams will all extend at the same rate without regard to the relative resistances they may encounter. The fact that the two rams 36 and 38 are physically connected through the rock shaft 18 will assure that the 50% of the flow they receive will be equally divided.

Rephasing valves 106, 108 and 110 are positioned in conduits 112, 114 and 116 to respectively by-pass the rotors 90, 92 and 94. These valves are spring-biased check valves which permit flow only toward conduit 86. When one of the rams reaches the limit of its extension before the others, the rotor associated with that ram will continue to be driven by the rotors associated with the still extending rams. The pressure in the conduit leading to the fully extended ram will increase, unseating the rephasing valve and the flow will then join with that flow from the pump on the tractor to hasten the completion of the extension of the lagging ram or rams.

The rotors 90, 92 and 94 function in a similar manner on the contraction stroke when pressure is directed through conduit 80 and conduit 86 is connected with the reservoir.

A check valve 118 in the passage 102 permits free flow of fluid from the rotor 92 toward the rams 36 and 38 but prohibits flow in the other direction. An orifice 120 is connected in parallel with the check valve 118. When the frame is lowered by connecting the conduit 86 to the reservoir through movement of the directional control valve on the tractor, the weight of the implement on the center frame 12 will cause fluid to be expelled through the orifice 120, which is the only available path. The restriction of orifice 120 will cause the pressure to rise in conduit 102 upstream of the orifice and also control the drop rate of the center frame 12. The increased pressure in this portion of conduit 102 will be communicated through pilot conduits 122 and 124 to pilot-operated load check valves 126 and 128 positioned in conduits 100 and 104 respectively. The back pressure created by orifice 120 will assure that all three frames will start to lower at the same time. This assurance, coupled with provision of the load-check valve noted, is especially important since one of the wing frames will often carry heavy transport wheels which makes one wing frame much heavier and much more subject to hydraulic leak-down than the other frame sections.

Figure 2:
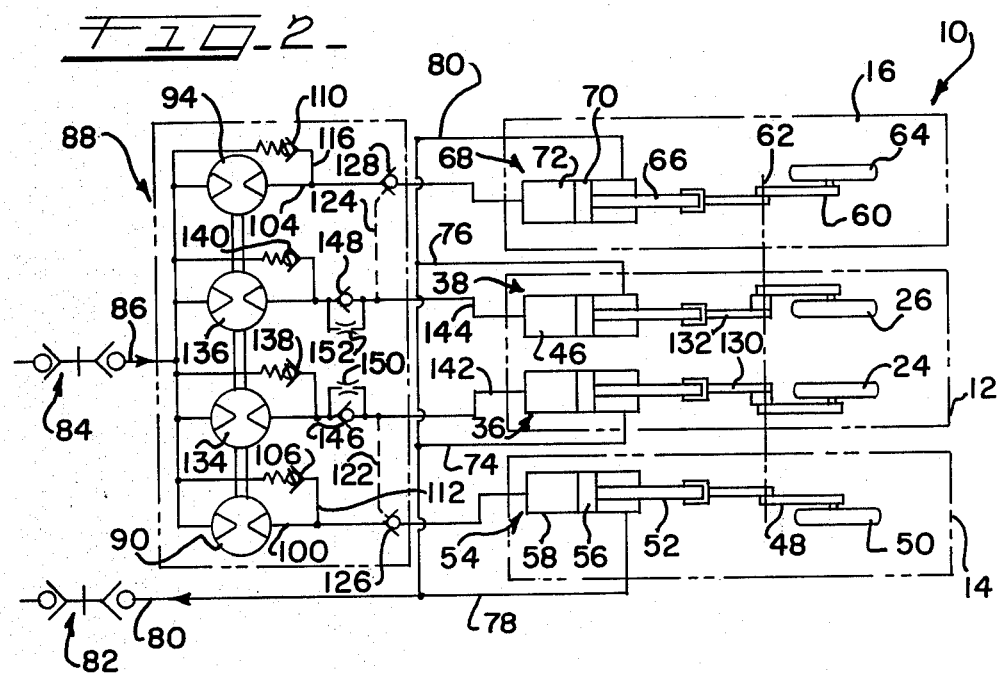
FIG. 2 is a similar schematic of another embodiment of the present invention in which fully independent rams of equal size are utilized.

Referring now to the embodiment shown in FIG. 2, the center frame 12 is supported on the wheels 24 and 26 by means of a pair of physically independent bell cranks 130 and 132 pivotally attached to the center frame 12 on the pivot axis 62. The rams 36 and 38 are pivoted to the bell cranks 130 and 132 and are otherwise the same as described in connection with the FIG. 1 embodiment. The rotary flow divider 88 has been modified to provide two rotors 134 and 136 in place of the single rotor 92 to supply the rams 36 and 38 with independent metered flow through conduits 142 and 144. Rephasing valves 138 and 140 are provided in by-pass conduits around the rotors 134 and 136 respectively. Check valves 146 and 148 with parallel orifices 180 and 152 are interposed in the conduits 142 and 144. The pilot lines 122 and 124 respectively communicate with the conduits 142 and 144. The function and operation of these components are the same as comparable components described in connection with the FIG. 1 embodiment. Assuming the rams 36, 38, 54 and 68 remain of equal size, the only difference in FIG. 2 is that the rotors 90, 134, 136 and 94 are sized to have a displacement so that the flow of fluid through conduit 86 is distributed equally to each ram, i.e., 25% of the flow is metered through each rotor.

Referring now to the embodiment of FIG. 3, the hydraulic system remains schematically the same as in FIG. 2. However, the geometry of the bell cranks has changed. The upper arms of the bell cranks 248 and 260 supporting the wheels 50 and 64 are shorter than the upper arms of bell cranks 230 and 232 supporting wheels 24 and 26. Consequently the stroke of the rams 236 and 238 must be longer than the stroke of rams 254 and 268. On the other hand, because the movement arm of the upper arm is longer for the bell cranks 230 and 232, the rams 236 and 238 need not have as big a diameter in order to exert the required lifting movement at equal pressures. This arrangement, which provides greater flexibility to the designer of the implement, can be accommodated by proper selection of the displacement of the rotors 90, 134, 136 and 94. For a given geometry, for example, these rotors may be selected to proportion the flow from conduit 86 in a ratio of 20%-30%-30%-20% respectively into conduits 100, 142, 144 and 104. This proportion would permit the rams 236 and 238 to have a longer stroke than rams 254 and 268, for example.

The embodiment of FIG. 4 is schematically the same as FIG. 1. The only distinction here is that the rams 36 and 38 in FIG. 1 have been replaced by a single ram 300. If this ram has a stroke equal to that of rams 54 and 68 and twice their diameter, the rotors 90, 92 and 94 can be sized to provide a 25%-50%-25% split of the pump flow. If the diameter is less than twice, then these rotors will have to be adjusted to provide the proper split, assuming the geometry of the wheel assemblies remains constant.

While four embodiments of the present invention have been illustrated and described herein, it is understood that various changes and modifications may be made therein without departing from the spirit of the invention as defined by the scope of the appended claims.

What is claimed is:

1. In an implement having a main frame and at least one wing frame flexibly connected thereto, a wheel assembly on each frame for raising and lowering the associated frame, a hydraulic circuit for controlling said wheel assemblies comprising:

a hydraulic ram means connected to each wheel assembly, each wheel assembly ram means releasing a flow of hydraulic fluid to lower the associated frame;

a rotary flow divider having a rotor for metering flow to each hydraulic ram means;

a check valve between the ram means on said main frame and its associated rotor for permitting flow only toward said ram means;

an orifice in parallel with said check valve effective to generate a valve-piloting back pressure while affording only restricted flow from the ram means on said main frame for slowed lowering of the latter;

a pilot-operated check valve interposed between the ram means on said wing frame and its associated rotor;

and a pilot line hydraulically interposed between said orifice and ram means on said main frame for connecting said pilot-operated check valve thereto for insuring contemporaneous flow from both said ram means whereby the wing frame lowers in unison with said main frame.

2. In an implement having a main frame and a pair of wing frames pivotally connected on either side of said main frame, a wheel assembly on each frame for determining the elevation of the associated frame; a hydraulic circuit for controlling said wheel assemblies comprising:

first and second hydraulic rams on said main frame and coupled to its wheel assembly;

third and fourth hydraulic rams respectively mounted on the wing frames and coupled to their wheel assemblies;

a rotary flow divider for proportioning flow having main line valve connections (118, 126, 128) to said rams so that by receiving proportioned flow they raise the frames in unison, said valve connections (126, 128) effective to open the main line flow to the rams and to close the main line flow from the rams;

rephasing valve means in said flow divider to permit said rams to synchronize with each other; and coordinating means (122, 124) operatively between said valve connections including back pressure generating means (118, 120) effective on lowering said frames to assure the wing frames lower in unison with said main frame.

3. The invention according to claim 1 or 2, wherein said rotary flow divider provides a split of flow with one-half to the main frame and one-fourth to each of said wing frames.

4. The invention according to claim 1, wherein said main frame has two independent wheel assemblies and a hydraulic ram is connected to each assembly.

5. The invention according to claim 2, wherein said first and second rams are connected to independent wheel assemblies on said main frame.

6. The invention according to claim 2, wherein said first and second rams are physically interconnected on said main frame.

7. The invention according to claim 1, wherein the hydraulic ram means on the main frame is a single hydraulic ram.

8. The invention according to claim 7, wherein a wing frame is provided on each side of said main frame and said main frame ram has a diameter twice that of the wing frame rams.

9. The invention according to claim 2, wherein:

the main frame wheel assembly has a lever arm longer than that of the wing frames; and the first and second rams have a stroke longer than said third and fourth rams.

* * * * *